Figure 1:
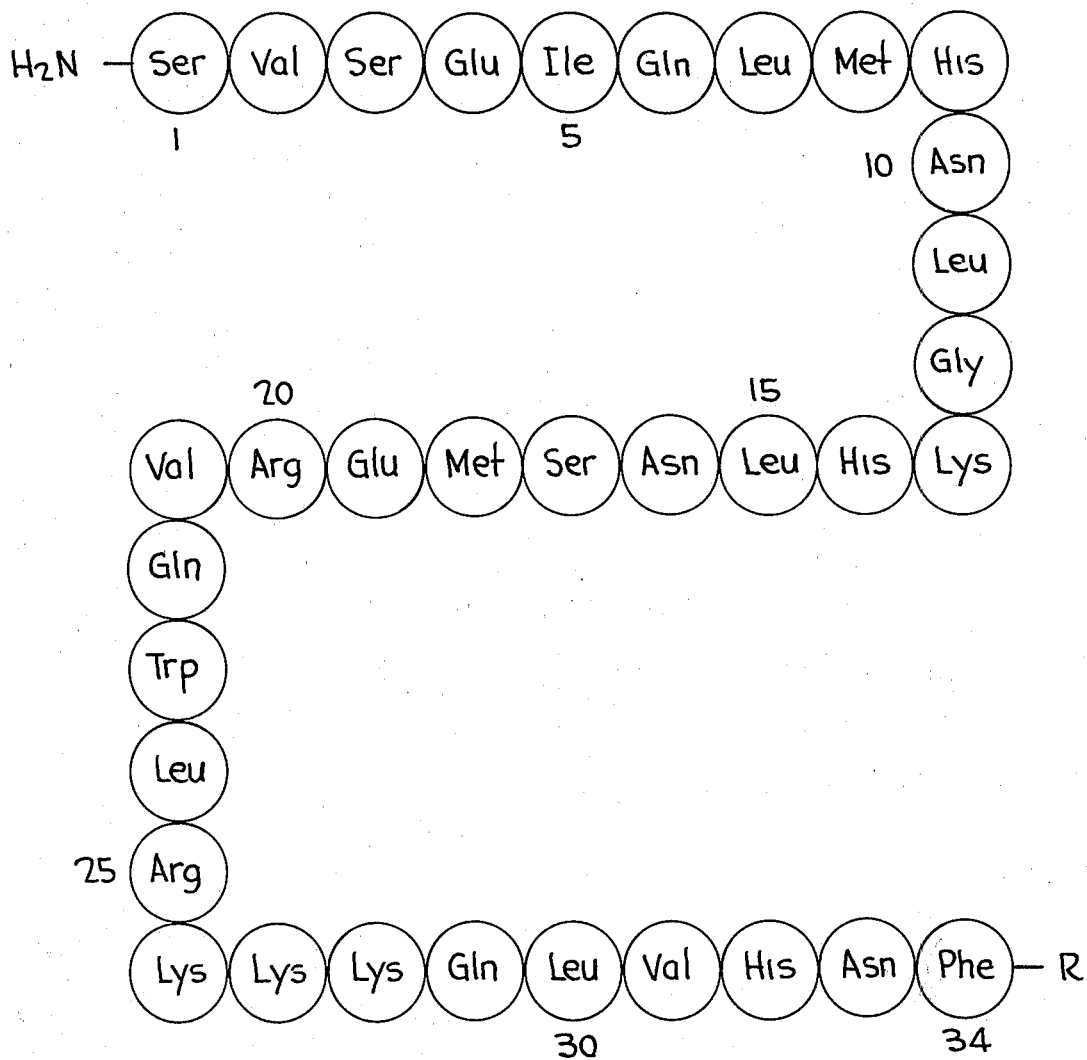

United States Patent [19]

Brewer et al.

[11] 3,886,132

[45] May 27, 1975

[54] HUMAN PARATHYROID HORMONE

[75] Inventors: Hollis Bryan Brewer, Potomac, Md.; Claude D. Arnaud, Rochester, Minn.

[73] Assignee: The Government of the United States Assistant Secretary, Department of Health, Education, and Welfare, Washington, D.C.

[22] Filed: Dec. 10, 1973

[21] Appl. No.: 423,303

Related U.S. Application Data

[63] Continuation-in-part of Ser. No. 317,702, Dec. 21, 1972, abandoned.

[52] U.S. Cl............................. 260/112.5; 424/177
[51] Int. Cl.. C07c 103/52; C07g 7/00; A61k 27/00
[58] Field of Search................... 260/112.5; 424/177

[56] References Cited
OTHER PUBLICATIONS

Brewer et al., Proc. Nat. Acad. Sci. USA, 69, 3585–3588 (1972).

*Primary Examiner*—Lewis Gotts
*Assistant Examiner*—Reginald J. Suyat

[57] ABSTRACT

Human parathyroid hormone was isolated in highly purified form from human parathyroid adenomas. The primary sequence of the amino terminal 34 residues was determined and the peptide of the first 34 residues synthesized.

1 Claim, 2 Drawing Figures

AMINO ACID SEQUENCE OF THE AMINO TERMINAL 34 RESIDUES OF HUMAN PARATHYROID HORMONE

FIG. 2

HUMAN PARATHYROID HORMONE

H₂N—Ser-Val-Ser-Glu-Ile-Gln-Leu-Met-His-Asn-Leu-Gly-Lys-His-Leu-Asn-Ser-Met-Glu-Arg-Val-Glu-Trp-Leu-Arg-Lys-Lys-Leu-Gln-Asp-Val-His-Asn-Phe—R
1 — 5 — 10 — 15 — 20 — 25 — 30 — 34

BOVINE PARATHYROID HORMONE

H₂N—Ala-Val-Ser-Glu-Ile-Gln-Phe-Met-His-Asn-Leu-Gly-Lys-His-Leu-Ser-Ser-Met-Glu-Arg-Val-Glu-Trp-Leu-Arg-Lys-Lys-Leu-Gln-Asp-Val-His-Asn-Phe—R
1 — 5 — 10 — 15 — 20 — 25 — 30 — 34

PORCINE PARATHYROID HORMONE

H₂N—Ser-Val-Ser-Glu-Ile-Gln-Leu-Met-His-Asn-Leu-Gly-Lys-His-Leu-Ser-Ser-Leu-Glu-Arg-Val-Glu-Trp-Leu-Arg-Lys-Lys-Leu-Gln-Asp-Val-His-Asn-Phe—R
1 — 5 — 10 — 15 — 20 — 25 — 30 — 34

HUMAN PARATHYROID HORMONE

This application is a continuation-in-part of copending application Ser. No. 317,702, filed Dec. 21, 1972, now abandoned.

This invention relates to peptides, and more specifically to the biologically active amino terminal 34 residues of the human parathyroid hormone.

During the last few years a significant core of information has been obtained by a number of laboratories on the chemistry, biosynthesis, and secretion of the parathyroid hormone (PTH). These studies have indicated that the parathyroid hormone is initially synthesized as a prohormone, proparathyroid hormone. Proparathyroid hormone contains approximately 106 amino acids, and has an apparent molecular weight of 12,500. The prohormone is rapidly converted into the storage or glandular form of the hormone consisting of 84 amino acids, and a molecular weight of 9,500. The complete amino acid sequences of the 84 amino acid parathyroid hormone from the bovine and porcine species have been reported. Following appropriate physiological stimuli the 9,500 molecular weight form of the parathyroid hormone is secreted into the circultion. Shortly after entering the peripheral circulation the glandular form of the hormone is cleaved into smaller fragments. Gel filtration of human hyperparathyroid serum by several investigators have revealed a major immunoreactive fragment(s) with a molecular weight of 5–8,000 and several minor components. Immunochemical heterogeneity of the circulating human parathyroid hormone, presumably due to the different molecular forms of PTH, was initially reported by Berson and Yalow (*J. Clin. Endo. Met.* 18, 1037–1047 (1968)), and has been confirmed by others. The specific site(s) of cleavage in the 84 amino acid polypeptide chain of the parathyroid hormone in the general circulation is as yet unknown, and the biological activity of the resulting fragments which make up the majority of the immunochemical circulating hormone has not been reported. A biologically active peptide fragment of bovine PTH, prepared by dilute acid cleavage, has been reported, indicating that the intact 84 amino acid polypeptide is not needed for biological activity. This peptide has been identified as the amino terminal peptide of the hormone, and is composed of the initial 30 residues of the sequence (Keutmann et al, *Biochem.* 11, 1973–1979 (1972)). Synthetic peptides of the first 34 residues of the bovine hormone, and the initial 30 residues of the procine hormone have been prepared and are biologically active, thereby confirming the localization of the biologically active region of the parathyroid hormone to the amino terminal third of the 84 amino acid polypeptide chain. There has, heretofore, been no identification of the sequence of the initial residues in the human hormone. It follows, however, that the biological activity of the human hormone would lie in the first 34 residues.

It is, therefore, a primary object of the present invention to obtain the primary sequence of the amino terminal 34 residues of human PTH.

It is another object of the present invention to provide a synthetic peptide comprising the amino terminal 34 residues of human PTH.

ISOLATION AND IDENTIFICATION

The human parathyroid hormone used in these studies was isolated from parathyroid adenomas obtained from patients undergoing surgery for hyperparathyroidism. Dried, defatted parathyroid tissue was initially extracted with 8M urea in 0.2N hydrochloric acid, and fractionated with ether, acetic acid, sodium chloride, and trichloroacetic acid (TCA powder) according to the procedure of Rasmussen et al in *J. Biol. Chem.* 239, 2852–2857 (1964). The TCA powder was further purified by gel filtration, followed by ion exchange chromatography on CM-sephadex employing an ammonium acetate gradient. The isolation of the hormone was monitored by radioimmunoassay and disc gel electrophoresis.

Amino acid analyses were performed on a Beckman-Spinco automatic amino acid analyzer, Model 120B or 121 adapted for high sensitivity or a Durrum Model 500 analyzer. Analytical disc gel electrophoresis was performed in 8M urea at pH 4.4 as previously reported by Brewer et al in *J. Biol. Chem.* 246, 5739–5742 (1970). Immunoassays were performed by the procuedure of Arnaud et al in *J. Clin. Invest.* 50, 21–34 (1971).

Automated Edman degradations were performed with the Beckman Sequencer, Model 890B, utilizing a 1M Quadrol buffer. The phenylthiohydantoin (PTH) amino acids were identified by regeneration to the constituent amino acid by hydrolysis with hydroiodic acid for 20 hours at 130°C., 1 gas liquid chromatography (2,3) and mass spectrometry. (4,5,6) chemical ionization (CI) mass spectrometry was performed on a Finnigin mass spectrometer equipped with a PDP-8/e Digital computer, and a Complot Plotter. Isobutane was used as the carrier gas, and the source was maintained at 200°C. The samples were applied by a direct insertion probe, and the probe was heated from 30° to 250°C. over a 90 sec period. Electron impact (EI) mass spectrometry was performed on an LKB mass spectrometer Model 9000 using a direct insertion probe and an electron energy of 70eV.

(1). 1). Smithies, O., Gibson, D., Fanning, E. M., Goodfliesh, R. M., Gilman, J. C., & Ballantyne, D.L. (1971) Biochem. 10, 4912–4918.
(2). Pisano, J. J., & Bronzert, T., (1969) J. Biol. Chem. 244, 5597–5607.
(3). Pisano, J, J., Bronzert, T., & Brewer, H. B., Jr. (1972) Anal. Biochem. 45, 43–59.
(4). Hagenmaier, H., Ebbighausen, W., Nicholson, G., & Votsch, W. (1970) Zeitschr Naturforsch 25b, 681–689.
(5). Fairwell, T., & Lovins, R. E. (1971) Biochem. Biophys. Res. Comm. 43, 1280–1289.
(6). Fales, H. M., Nagai, Y., Milne, G. W. A., Brewer, H. B., Jr., Bronzert, T. J., & Pisano, J. J., Anal. Biochem. 43, 288–299 (1971)

The purified human parathyroid hormone migrated as a single component on disc gel electrophoresis with a mobility which was identical to that of the bovine parathyroid hormone. Amino terminal analysis of the purified peptide by the Edman technique revealed serine.

350 nanomoles of the purified hormone were degraded on the Beckman Sequencer using a single cleavage of heptofluorobutyric acid at each degradation. The results of the degradation of the first 34 residues of the human parathyroid hormone are shown in FIG. 1. A "quasimolecular" (QM$^+$) or major fragmentary ion is observed in each of the CI mass spectra. At step 12 in the sequence a quasimolecular ion for glycine (m/e 192) and leucine (m/e 249) are observed. Quantitation by the gas chromatography method of glycine (.28 µM) and leucine (.09 µM) permits definite identification of glycine as the twelfth amino acid in the sequence with the leucine resulting from overlap from step 11 (FIG. 1.). Leucine/isoleucine and lysine/glutamine yield identical masses of m/e 264 respectively on CI mass spectrometry. Lysine, however, can be distinguished from glutamine by the fragmentary ion at m/e 306. Lysine/glutamine and leucine/isoleucine were also readily differentiated by gas chromatography on the CFC blend and by EI mass spectrometry.

These combined results provided a single unique sequence for the first 34 residues of the human parathyroid hormone (FIG. 1)

UTILITY

The amino acid sequence of the first 34 residues of human parathyroid hormone is of major importance since previous studies of the bovine and procine species have indicated that this is the biologically active region of the native hormone. The first 34 residues of human PTH differ from the bovine by 6 residues, and the porcine by 5 residues (FIG. 2). The amino terminal 15 residues of human and procine PTH are identical, however bovine differs from human and porcine PTH in positions 1 and 7 where alanine substitutes for serine, and leucine replaces phenylalanine (FIG. 2). In the remaining 16–34 region human PTH differs from porcine PTH by 5 residues, and from bovine PTH by 4 residues (FIG. 2). Human PTH contains 2 methionine residues similar to the bovine species, whereas porcine PTH contains a single methionine at position 8 (FIG. 2). The human sequence is unusual in that it contains 4 consecutive basic residues (arginine residue 25, and lysine residues 26 to 28). Amino acid residues in the first 34 which are unique to the human sequence include an asparagine at position 16, glutamine at position 22, lysine at position 28, and a leucine at position 30.

One of the major problems in the clinical assessment of patients with disorders of mineral metabolism has been the difficulties encountered with the radioimmunoassay of human parathyroid hormone. There have been two basic problems with the immunoassay of PTH. The first problem, as discussed earlier, has been the presence in the peripheral circulation of peptide fragments of the 84 amino acid polypeptide chain. The antisera from various laboratories undoubtedly have immunological determinants for different regions of the intact molecule, thus leading to variable and sometimes inconsistent results when applied to the measurement of PTH circulation in human blood. In addition, the differentiation by immunoassay of biologically active amino terminal fragments from inactive fragments has as yet been impossible. The second difficulty has been the utilization of heterologous assays employing radioactive labeled bovine hormone as the tracer, and antibodies prepared against the bovine or porcine hormone. The sensitivities of these assays are therefore variable, and depend on the cross reactivity of the particular antiserum with the human hormone. As noted above, the human sequence in only the initial third of the molecule differs from the bovine by 6 residues and the porcine by 5 amino acids.

Habener, et al (*Nature New Biology* 238, 152–154 (1972) have attempted to circumvent some of these problems with the immunoassay by the development of amino and carboxyl specific antisera. These investigators have used an antibody prepared against the bovine hormone, and have absorbed their antiserum with either the synthetic 1–34 bovine fragment, or a 53–84 fragment prepared by chemical cleavage of the native bovine hormone. The amino terminal specific antiserum was further characterized by displacement with synthetic bovine fragments, and the recognition site of this absorbed antiserum was shown to be directed toward residues 14 to 19 in the bovine sequence. Using this approach, they have concluded that the major fragment in the human circulation is carboxyl terminal, and biologically inactive. They were, however, unable to identify the amino terminal fragment in the circulation of human subjects. This may be due to either the rapid clearance of the amino terminal specific bovine antiserum with the amino terminal region of the human hormone. It is of interest that the human sequence differs in the 14 to 19 region from the bovine hormone by the substitution at step 16 of an asparagine for a serine residue (FIG. 2). The significance of this substitution in the human hormone to the results they have obtined with their amino terminal specific bovine antiserum is as yet unknown. Canterbury and Reiss have reported results on the nature of the circulating fragment of the parathyroid hormone that are in contrast to those reported by Habener, et al. Using an antiserum prepared against bovine parathyroid hormonne, these investigators have identified three different immunochemical forms of the parathyroid hormone in the peripheral circulation of hyperparathyroid patients (*J. Clin. Invest.* (in press) (1973)). The molecular weight of these three components, as determined by gel filtration, were 9500 (presumably glandular PTH), 7000–7500, and 4500–5000. Recently these investigators have directly accessed the biological activity of these three fragments in a renal adenyl cyclase system. Both the 9500 and the 4500–5000 fragment stimulated the adenyl cyclase system, whereas the 7000–75000 component was inactive. These results are consistent with the presence of an amino terminal active fragment of PTH of approximately one-half the size of the glandular hormone in human hyperparathyroid serum.

The determination of the amino terminal sequence of the human parathyroid hormone now permits the synthesis of peptides based on the human sequence for both clinical and investigative use. Synthetic fragments, as well as chemical analogues, permit more definitive studies to be performed on the chemistry of the human hormone, including the specific residues and the minimum length of the polypeptide chain that is required for biological activity. In addition, these synthetic fragments enable investigators to characterize the heterologous antisera currently in use in the immunoassay, and to develop specific antisera directed toward the amino terminal region of the human hormone. Antisera based on the human sequence will enable more detailed studies to be performed on the nature of the circulating hormone in man, and its role in calcium homeostasis and metabolic bone disease.

Clinically, the synthetic hormone can be used for replacement therapy for the natural human parathyroid hormone. The peptide is administered in microgram quantities by intravenous (IV) or intramuscular (IM) injection. Actual dosage is dependent on many factors including, but not limited to, the patient's tolerance, side effects, and the like, but can be routinely determined by one of ordinary skill in the art. The vehicle for the hormone would be any physiologically tolerable vehicle having approximately neutral pH, such as physiological saline solution. The synthetic hormone can also be used in diagnostic procedures, based on the fact that parathyroid hormone produces hypercalcemia, hypocalcemia, hyperphosphaturia, and increased urinary cyclic AMP in normal individuals. In this procedure the patient's response is evaluated by administering the peptide either IV or IM and the serum calcium, urinary calcium, phosphate, and cyclic AMP is monitored.

SYNTHESIS

The peptides based on the human sequence are synthesized by either of two known methods. The first is the solid phase synthesis technique of R. B. Merrifield et al. reported in *Advances in Enzymology* 32, 221 (1969) and forming the subject matter of U.S. Pat. No. 3,531,258 issued on Sept. 29, 1970, the subject matter of which is incorporated herein by reference. The second is the classical synthesis described by M. Bodanszky and M. A. Ondetti in *Peptide Synthesis*, Interscience (New York 1966) the subject matter of which is incorporated herein by reference.

THE SOLID PHASE SYNTHESIS

The solid phase method of synthesizing a peptide chain, according to Merrifield et al, is based on the fact that the chain can be synthesized in a stepwise manner while one end of the chain is covalently attached to an insoluble solid support. During the intermediate synthetic stages the peptide remains in the solid phase and can therefore be manipulated conveniently without significant losses.

The automation of the process carried on by the apparatus of Merrifield et al is possible because all of the reactions, including the intermediate purification procedures, are conducted within a single reaction vessel. The apparatus also solves the problem of introducing the proper reagents and solvents into the vessel in the proper sequence at the proper times while maintaining sufficient flexibility to cope with a wide range of reactions and conditions which may occur due to modification of each of the reactions in the synthesis.

During the process the solid support is a chloromethylated styrene-divinylbenzene copolymer bead. The C-terminal amino acid is coupled as a benzyl ester to the resin and the peptide chain grows one residue at a time by condensation at the amino end with N-acylated amino acids. the tert-butyloxycarbonyl group has been the protecting group of choice and activation has usually been by the carbo-diimide or active ester routes.

In general in the apparatus of Merrifield et al, the proper reagents and solvents are selected by the solvent and the amino acid selector valves and are transferred by the metering pump from one of the reservoirs to the reaction vessel which contains the peptide-resin. After the desired period of mixing by the shaker the solvents, excess reagents and by-products are removed to the waste flask by vacuum filtration. These basic operations are repeated in prearranged sequence under electrical control until the synthesis of the desired peptide chain is complete. All parts of the apparatus which come into contact with solvents and reagents are made of glass or chemically resistant polymers.

Several preliminary operations are necessary before the synthesis of a peptide can be started. First, the supporting resin containing the C-terminal amino acid of the proposed peptide chain must be prepared and analyzed. This is done by esterification of a chloromethylated copolymer of styrene and divinylbenzene with the tert-butyloxycarbonyl (t.—BOC) amino acid. The product is freed of very fine particles of resin by flotation in methylene chloride to prevent subsequent clogging of the fritted discs of the reaction vessel. A sample of the vacuum-dried product is hydrolyzed in a 1:1 mixture of dioxane and 12 N HCl and the liberated amino acid is measured quantitively on an amino acid analyzer. The amino acid content is used to calculate the amounts of subsequent amino acid derivatives and dicyclohexylcarbodiimide reagent which will be used in the synthesis. The best range of substitution has been 0.1 to 0.3 mm. per gram. The tert-butyloxylcarbonyl amino acidresins are usually prepared in advance and are stored until needed.

The appropriate solvent reservoirs are filled with glacial acetic acid, methylene chloride and commercial (99.5%) absolute ethanol. N-N-Dimethylformamide is freed of dimethylamine and formic acid by shaking with barium oxide and distillation under reduced pressure. The 1 N HCl-acetic acid solution is prepared by adding 700 ml. of glacial acetic acid to the storage separatory funnel and passing in a slow stream of anhydrous hydrogen chloride. Samples are withdrawn at the bottom and titrated for chloride by the Volhard method. This solution, when protected by the long coil of capillary tubing and drying tube, is stable for several weeks without a significant decrease in concentration. The triethylamine reagent is prepared by mixing 50 ml. of triethylamine with 450 ml. of purified dimethylformamide.

The reaction vessel is loaded with a weighed amount of the t-BOC amino acid-resin (2 to 4 grams for a small, 45 ml. capacity vessel). The stopper is lubricated with silicone high vacuum grease and secured in place with springs, and the inlet and outlet lines are attached. In the synthesis three equivalents of each T.—BOC amino acid derivative are used per equivalent of the first amino acid on the resin. The calculated quantity of each of the first six amino acids is dissolved in 7 ml. of methylene chloride, filtered if necessary, and placed in the amino acid reservoirs in the proper sequence. Because of poor solubility in methylene chloride, t.—BOC-nitro-L-arginine is first dissolved in 2 ml. of dimethylformamide and diluted with 5 ml. of methylene chloride, while t.BOC-im-benzyl-L-histidine is dissolved in 7 ml. of pure dimethylformamide. The t.—BOC amino acid-p-nitrophenyl esters are dissolved in 16 ml. of pure dimethylformamide. During the automated synthesis the amino acid solutions are pumped completely into the reaction vessel and a precise concentration therefore is not required. The dicyclohexylcarbodiimide solution, on the other hand, is metered by the metering pump and the concentration of the reagent must be calculated for each run. Since the holdup volume and the total volume pumped are known, the actual volume of diimide solution delivered into the vessel can be calculated. The required quantity of dicyclohexylcarbodiimide is dissolved in this volume of methylene chloride. The total volume of solution prepared at one time depends on the number of amino acids to be added.

In a typical diimide cycle, the instrument first washes the resin three times with acetic acid by means of three sets of pumping, shaking, and outlet steps. The metering pump always stops at the end of an exhaust stroke to minimize solvent mixing, and the shaker always stops with the vessel in the upright position to make the following filtering (outlet) step possible. During the third of these outlet steps, the solvent valve advances to position 2, and the HCl-acetic acid reagent is then pumped into the vessel. The 30-minute reaction period necessary for complete removal of the tert-butyloxycarbonyl protecting group is obtained by use of three successive 10-minute shaking steps.

After this deprotection step, the resin is washed three times with acetic acid to remove hydrogen chloride, three times with ethanol to remove acetic acid, and three times with dimethylformamide. A 10-minute shaking period with triethylamine in dimethylformamide serves to neutralize the hydrochloride of the amino acid on the resin, thus liberating the free amine in preparation for coupling with the next protected amino acid. Triethylammonium chloride and excess triethylamine are removed by three washes with dimethylformamide, and prepare the resins for the coupling step. The t.—BOC amino acid solution is then pumped into the vessel in a 30-second pumping step. On the next step (rinse), the pump draws one more stroke of air, then three strokes of methylene chloride to flush the amino acid line.

The next step is a 10-minute shaking operation to allow the amino acid to soak into the resin beads. During this step, the solvent valve advances to the diimide position. At the next step, diimide solution is pumped for 30 seconds, and then the rinse step adds one more stroke of diimide solution and three strokes of methylene chloride. The coupling reaction then takes place during a 2-hour shaking cycle. After the coupling reaction, by-products and excess reagents are removed by three washes in methylene chloride and two washes in ethanol.

If the end-of-cycle switch is set in the hold position, the instrument stops after the third ethanol wash and the resin is left suspended in ethanol. If this switch is in the "go" position, the drum returns to the beginning of the cycle and proceeds to carry out the next cycle of operation. The apparatus will continue to operate for approximately 24 hours until the coupling cycle of the sixth amino acid has been completed. Then the end-of-run microswitch stops the apparatus. To continue the run, the amino acid reservoirs are washed (solvents are added to the reservoirs and drawn through the amino acid valve and the solvent valve to the waste flask through the three-way stepcock). The amino acid reservoirs are then refilled with the proper new solutions, the reagent and solvent reservoirs are replenished if necessary. The amino acid valve is set by a switch to position 12. The drum is then stepped manually back to step 1 to start the coupling of the next six amino acid residues.

Using this apparatus, an active ester coupling cycle may be accomplished instead of a diimide cycle using some different solvents and reagents with a change in order and setting the timers.

When the synthesis of the desired amino acid sequence has been completed, the peptide-resin is removed from the reaction vessel with the aid of ethanol, filtered, and dried. Weight gain of the resin during the synthesis provides an indication of the amount of peptide incorporated. The peptide is cleaved from the resin with HBr-trifluoroacetic acid and subjected to a suitable purification procedure.

The peptide of the present invention was synthesized by the solid phase method as outlined above and described by Merrifield et al. The peptide was synthesized on the Beckman Model 990 Peptide Synthesizer by the Beckman Company (Palo Alto, Calif.). The resin used was 1% cross-linked chloromethylated divinylbenzene polystyrene beads. Coupling of the resin was performed using t-butyloxycarbonyl amino acid in the presence of dicyclohexycarbodiimide in methylene chloride. The amino acid-resin was deblocked with trifluoroacetic acid in methylene chloride, and neutralized with triethylamine. Following the addition of the thirty fourth residue to the chain, the peptide was removed from the resin with liquid hydrogen fluoride.

In the drawings, and throughout this application, standard abbreviations are used according to the nomenclature:

| | |
|---|---|
| Serine | Ser |
| Valine | Val |
| Glumatic acid | Glu |
| Isoleucine | Ile |
| Glutamine | Gln |
| Leucine | Leu |
| Methionine | Met |
| Histidine | His |
| Glycine | Gly |
| Asparagine | Asn |
| Lysine | Lys |
| Arginine | Arg |
| Trytophan | Trp |
| Phenylalanine | Phe |

Other abbreviations are:

| | |
|---|---|
| Boc | t-butyloxycarbonyl |
| Bpoc | 2-(p-biphenylyl)-isopropyloxycarbonyl- |
| But | t-butyl |
| DCCI | dicyclohexylcarbodiimide |
| Hobt | 1-hydroybenzotriazole |
| Trt | Trityl- |
| Z | benzyloxycarbonyl- |

THE CLASSICAL SYNTHESIS

The peptide was also synthesized by a team at Ciba-Geyz AG (Bosle, Switzerland) using the classical method described by Bodansky et al. Intermediate products III, IV, VI, VIII, X and XII were prepared by standard methods. All the intermediate products are designated by the numbers III–XII in Table I.

TABLE I

FORMULAS OF THE PROTECTED INTERMEDIATE PRODUCTS III–XII

| No. | Sequence | Formula |
|---|---|---|
| III | 29–34 | H-Gln-Leu-Val-His-Asn-phe-OBut |
| IV | 25–28 | Z-Arg(H$^\oplus$)-Lys(Boc)-Lys(Boc)-Lys(Boc)-O$^\ominus$ |
| V | 25–34 | H$_2^\oplus$Arg-Lys(Boc)-Lys(Boc)-Lys(Boc)-Gln-Leu-Val-His(H$^\oplus$)-Asn-phe-OBut.3Cl$^\ominus$ |
| VI | 18–24 | Bpoc-Met-Glu(OBut) — Arg(H$^\oplus$)-Val-Gln-Trp-Leu-O$^\ominus$ |

TABLE I – Continued

FORMULAS OF THE PROTECTED INTERMEDIATE PRODUCTS III–XII

No. Sequence      Formula

VII 18–34
```
        OBut  H⊕                    H⊕ Boc Boc Boc              H⊕
         |    |                      |  |   |   |                |
    ⊕
  H₂-Met-Glu—Arg-Val-Gln-Trp-Leu-Arg-Lys-Lys-Lys-Gln-Leu-Val-His-Asn-phe-OBut·4Cl⊖
```

VIII 13–17
```
        Boc           But
         |             |
  Bpoc-Lys-His-Leu-Asn-Ser-NHNH₂
```

IX 13–34
```
        Boc H⊕        But   OBut  H⊕                  H⊕ Boc Boc Boc
         | |           |     |    |                    |  |   |   |
    ⊕
  H₂-Lys-His-Leu-Asn-Ser-Met-Glu—Arg-Val-Gln-Trp-Leu-Arg-Lys-Lys-Lys-Gln-
         H⊕

Leu-Val-His-Asn-phe-Obut·5Cl⊖
```

X 4–12
```
        OBut
         |
  Trt-Glu-Ile-Gln-Leu-Met-His-Asn-Leu-Gly-OH
```

XI 4–34
```
        OBut              H⊕       Boc H⊕         But     OBut H⊕
         |                 |        |  |           |       |    |
    ⊕
  H₂-Glu-Ile-Gln-Leu-Met-His-Asn-Leu-Gly-Lys-His-Leu-Asn-Ser-Met-Glu—Arg-
                    H⊕ Boc Boc Boc
                     |  |   |   |
  Val-Gln-Trp-Leu-Arg-Lys-Lys-Lys-Gln-Leu-Val-His-Asn-phe-OBut·6Cl⊖
```

XII 1–3
```
        But   But
         |     |
  Boc-Ser-Val-SerNHNH₂
```

From the intermediate products III–XII, the final sequence 1–34 (II) was formed. II is the protected sequence 1–34, with the Boc and But protecting groups on position 1, But on positions 3, and 17, OBut on positions 4, 19, and 34, and Boc on positions 13, 26, 27, and 28. II was formed by the scheme:

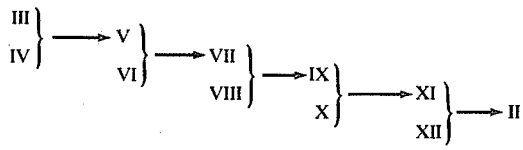

In the following description Rf refers to thin layer chromatography. S denotes silica gel and C denotes cellulose plates.

Sequence 15–34 (V)

Fragments III and IV were combined by means of DCCI—HOBt7. The crude product was precipitated from acetonitrile-water and was chromatographed by thin layer chromatography using silica gel and an acetic ester, pyridine acetic acid, water (61:21:6:11) solvent system (system 100), Rf (S=0.32). The Z-group was removed by means of catalytic hydrogenation over Pd/C. 3 eq. of HCl were simultaneously added. V was obtained as the trihydrochloride.

(7). Konig, W. & Geiger, R., Chem. Ber., 103, 788 (1970).

Sequence 18–34 (VII).

Coupling of V with the fragment 18–24 (VI) by means of DCCI-HOBt produced the Bpoc-derivative of VII. This was then purified by means of counter-current-distribution in a methanol/0.1 M aqueous ammonium acetate (pH–7.0)/chloroform/carbon tetrachloride 10:4:7:3 system (K=0.33), Rf(S)=0.16 in system 100. Separating the Bpoc-group by means of HCl in trifluroethanol produced the tetrahydrochloride VII.

Sequence 13–34 (IX).

VII was condensed with the azide, produced from VIII and then purified. the Bpoc-derivative thus obtained from IX by means of counter-current-distribution in the methanol/ammoniumacetate/chloroform/carbon tetrachloride system already described (K=0.65), Rf(S)=0.40 in a 2-butanol/acetic acid/water (67:10:23) system (system 96), =0.30 in system 100. the Bpoc-group was again removed with HCl in trifluoroethanol and IX as the pentahydrochloride, Rf(S)—0.23 (system 96) was obtained.

(8). Honzl, J. & Rudinger, J., Coll. Czechoslov. Chem. Commun. 26, 2333 (1961).

Sequence 4–34 (XI).

IX was then coupled with X by means of DCCI-HOBt and the trityl-derivative from XI was the purified by means of counter-current-distribution (system as in IX), K-0.35; Rf(S)=0.28 in system 100. The trityl group was then removed by HCl in trifluoroethanol to the hexahydrochloride of XI, Rf(S)=0.36 in system 96.

Protected Sequence 1–34 (II).

XI was coupled, according to Honzl and Rudinger with the azide which was produced from XII, and the raw product in a methanol/.2M aqueous ammonium acetate (pH=4.75)/chloroform/carbon tetrachloride 10:3:8:4 system (K-0.21); Rf(S)=0.43 in system 96; =0.30 in system 100.

I, Free Human PTH.

The protecting groups were removed from II by means of concentrated hydrochloric acid (10 min., at 0°C) and the hydrochloride of the peptide (I) was added to the acetate via ion-exchange. The peptide thus obtained contained only very small amounts of by-products, mainly a mixture of a methionine-S-oxide-derivative.

Characterization:

Rf(C)=0.36 in a 1-butanol/pyridine/acetic acid/water, 38:20:5:24, system (system 151); =0.54 (system 54). Thin layer electrophoresis in HCl in trifluoroethanol, pH-1.9, 90 min., 16 V/cm, running path of 6cm to the cathode. Distribution Coefficient K=0.12 (n-butanol/0.2M aqueous ammonium acetate (pH=4.75)/methanol 4:4:1).

Amino-Acid-Analysis (Hydrolysis 15 hours, 118°, 6N HCl) Trp 0.51 (1) (the content of a Trp residue in unhydrolyzed I resulted in a uv spectrum λmax=280,288nm); Lys 3.85 (4); His 2.75 (3); Arg 1.88 (2); Asp 3.05 (3); Ser 2.47 (3); Glu 5.06 (5); Gly 1.07 (1); Val 3.16 (3); Met 1.96 (2); Ile 1.03 (1); Leu 4.75 (5); Phe (base value) 1.00.

Methionine-S-Oxide-Derivative:

a. mixture of the $Met^8$- and $Met^{18}$-mono-S-oxide (I in 0.6% aqueous $H_2O_2$, 3 min. 25°) Rf(C)=0.29 in system 151; =0.45 in a 1-butanol/pyridine/acetic acid/water, 38:24:8:30, system (system 101); =0.48 in a 2-butanol/2-propanol/9% chloroacetic acid, 58:8:34:(v/v), system (system 54).

b. $Met^{8,18}$-di-S-oxide (I in 0.6% aqueous $H_2O_2$ 45 min., 25°); Rf(C)=0.21 in system 151; =0.39 in system 100; =0.43 in system 54.

Biological Activity.

I showed in the thyro-parathyroid ectomy rat, 2 hours after intraveneous injection, in dosages of 100 and 500 μg, a clear increase of the calcium concentration in the serum.

What is claimed is:

1. The peptide represented by the L-isomers of:
H<sub>2</sub>N-Ser-Val-Ser-Glu-Ile-Gln-Leu-Met-His-Asn-Leu-Gly-Lys-His-Leu-Asn-Ser-Met-Glu-Arg-Val-Gln-Trp-Leu-Arg-Lys-Lys-Lys-Gln-Leu-Val-His-Asn-Phe-R, wherein R is a carboxyl group.

* * * * *